June 3, 1941.　　G. GOEBEL ET AL　　2,244,651
COATING APPARATUS
Filed July 16, 1937　　10 Sheets-Sheet 2

Fig. 2.

Inventors
George Goebel
Harry A. Rau
By
Attorneys

Inventors
George Goebel
Harry A. Rau

Patented June 3, 1941

2,244,651

UNITED STATES PATENT OFFICE 2,244,651

COATING APPARATUS

George Goebel and Harry A. Rau, Baltimore, Md., assignors to Crown Cork & Seal Company, Inc., Baltimore, Md., a corporation of New York Application July 16, 1937, Serial No. 154,108

14 Claims. (Cl. 91—45)

The present invention relates to a coating apparatus and, more particularly, to an apparatus for coating containers or elements thereof.

The principal object of the invention is to provide a coating apparatus which is applicable for various coating operations upon numerous types and sizes of articles including containers, the apparatus being particularly designed to operate with maximum efficiency of coating and optimum speed as well as with minimum waste of coating composition.

Numerous types of containers must be coated with liquid before they are ready for use, and all elements of metal containers, in particular, are usually coated with a lacquer at least on their interior surfaces to prevent substances later placed in the containers from coming into direct contact with the metal. Numerous types of apparatuses have been developed for this coating operation, but all such apparatuses previously constructed have been so designed that their speed of operation was not sufficiently great to keep pace with the apparatuses to which they delivered the coated containers. Furthermore, many of these apparatuses have been so constructed that the containers did not move through the same in a continuous movement.

An important object of the invention is to provide a container coating apparatus which will efficiently coat a container at optimum speed.

Another object of the invention is to provide a container coating apparatus wherein the coating operation will be performed without interrupting the movement of the container.

It is not always possible to maintain an uninterrupted delivery of containers to a container coating apparatus, and it is therefore desirable to have the apparatus so constructed that the container coating means will not project coating liquid unless a container is in position to receive the coating, otherwise the liquid will be sprayed upon the machine itself and will interfere with its operation.

Another object of the invention is to provide a container coating apparatus wherein the container coating means is so controlled that if a container is not positioned opposite this means, no coating liquid will be projected therefrom.

Another important object of the invention is to provide an apparatus of the type described which will be adjustable to permit it to operate upon containers of various sizes.

Because of the problems peculiar to the designing of a container coating machine, it has heretofore been difficult to have the machine adjustable to efficiently operate upon containers of different sizes. The various elements of the apparatus of the present invention are so arranged with respect to each other that the machine is adjustable for various size containers and may be readily converted to handle any one of a number of different sized containers.

The liquid projected upon metal containers to coat the same is usually of a quick drying nature, and since the means for projecting the liquid is not continuously operating, when the flow of liquid is temporarily discontinued, the liquid may dry upon the liquid projecting nozzle and clog the same.

Another important object of the present machine is to provide a means for cleaning the nozzle of the liquid projecting means immediately after flow therefrom has been discontinued, and to thereby prevent the liquid from drying on and clogging the nozzle.

Another important object of the present invention is to provide a mechanism for controlling the movement and delivery of containers to a container coating apparatus, or to any container handling apparatus of a similar type of construction.

Other objects and advantages of the invention will be apparent from the following drawings wherein:

Figure 9 is a detail vertical sectional view taken on the line 9—9 of Figure 8 and showing, in retracted position, one of the liquid projecting means or spray guns used in the apparatus;

General construction and operation

Figure 1:
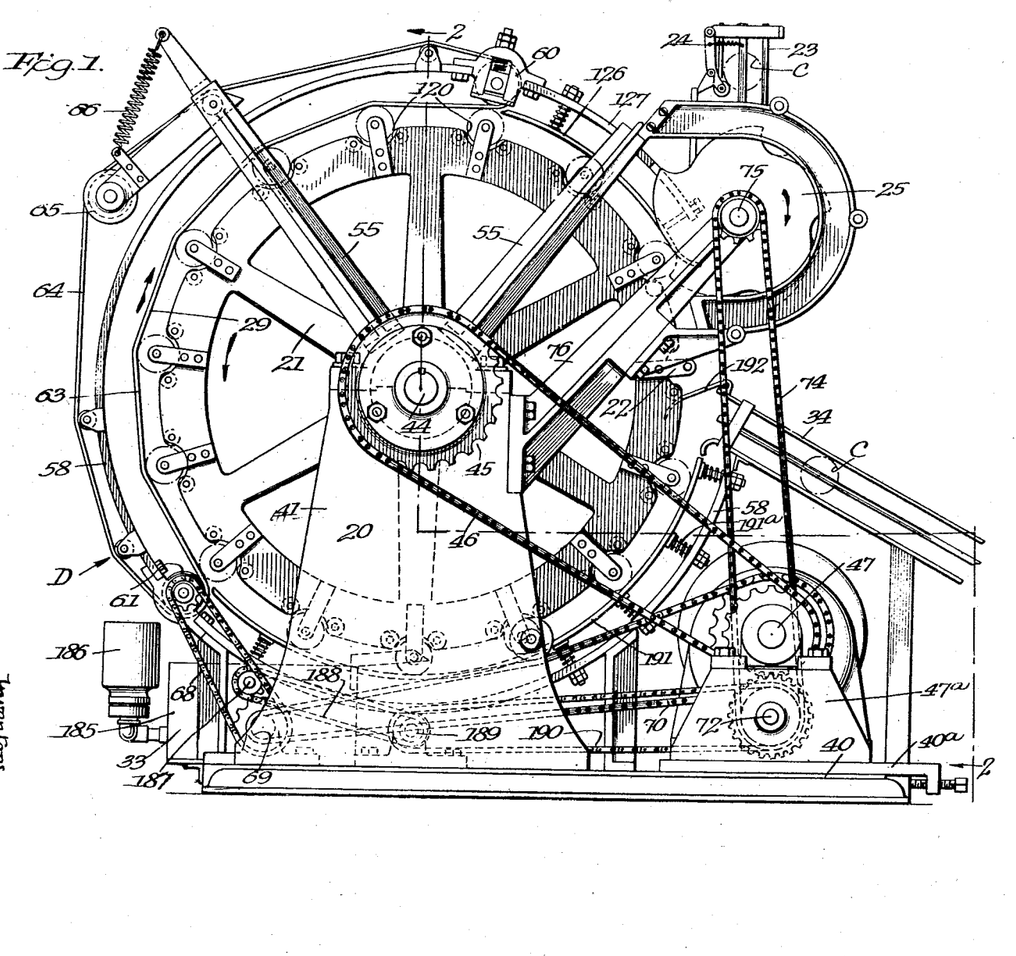
Figure 1 is a side view of the apparatus showing the left-hand end of Figure 2.

The construction and operation of the preferred form of the apparatus disclosed in the drawings may be generally described as follows: The stationary base 20 of the machine has a container supporting element 21 rotatably journaled thereon on a horizontal axis as shown in Figure 1. The element 21 has container receiving pockets 22 spaced about its periphery, each of which pockets is adapted to receive a container or container element C. In the operation of the apparatus specifically referred to herein, the devices being operated upon and hereinafter referred to as containers are the open ended body portions of metal cans. The containers are delivered to the apparatus from a chute 23 through a feed control or gate mechanism 24, which mechanism positions the successive containers in pockets spaced about the periphery of a horizontally journaled infeed dial 25, which, in turn, positions the containers in the pockets 22 of the container supporting element 21. A wheel or disc 26 (Figure 2) which rotates with the element 21 carries a plurality of fluid projecting means or spray guns 27 on its periphery which extend outwardly from disc 26 and toward supporting element 21, a spray gun 27 being reciprocably mounted on the disc 26 in alignment with each of the container receiving pockets 22 of element 21. A circular stationary cam track 28 is provided between disc 26 and container supporting element 21 to control the position of the respective spray guns 27 with respect to the containers C and also to control flow from the spray guns as the container supporting element 21 and spray gun supporting disc 26 rotate about the same.

After a container C has been positioned in a pocket 22 of element 21, the rotation of the spray gun supporting disc 26 with the container supporting element 21, and with respect to the stationary cam 28, will cause the spray gun to move rectilinearly into the aligned container C. The cam control is such that when the gun has reached the limit of its movement into a container, fluid such as lacquer or other coating medium will be projected from the gun upon the inner side wall or walls of the container or can blank, this flow continuing while the spray gun is then moved outwardly from the container. During the time that the spray gun is moving out of a container, the container will be rotated about its own axis and upon the container supporting element 21 by a suitably driven endless belt 29 so that the fluid projected upon the interior of the container will be evenly distributed upon the container surface.

Figures 4, 5, 6, 7:
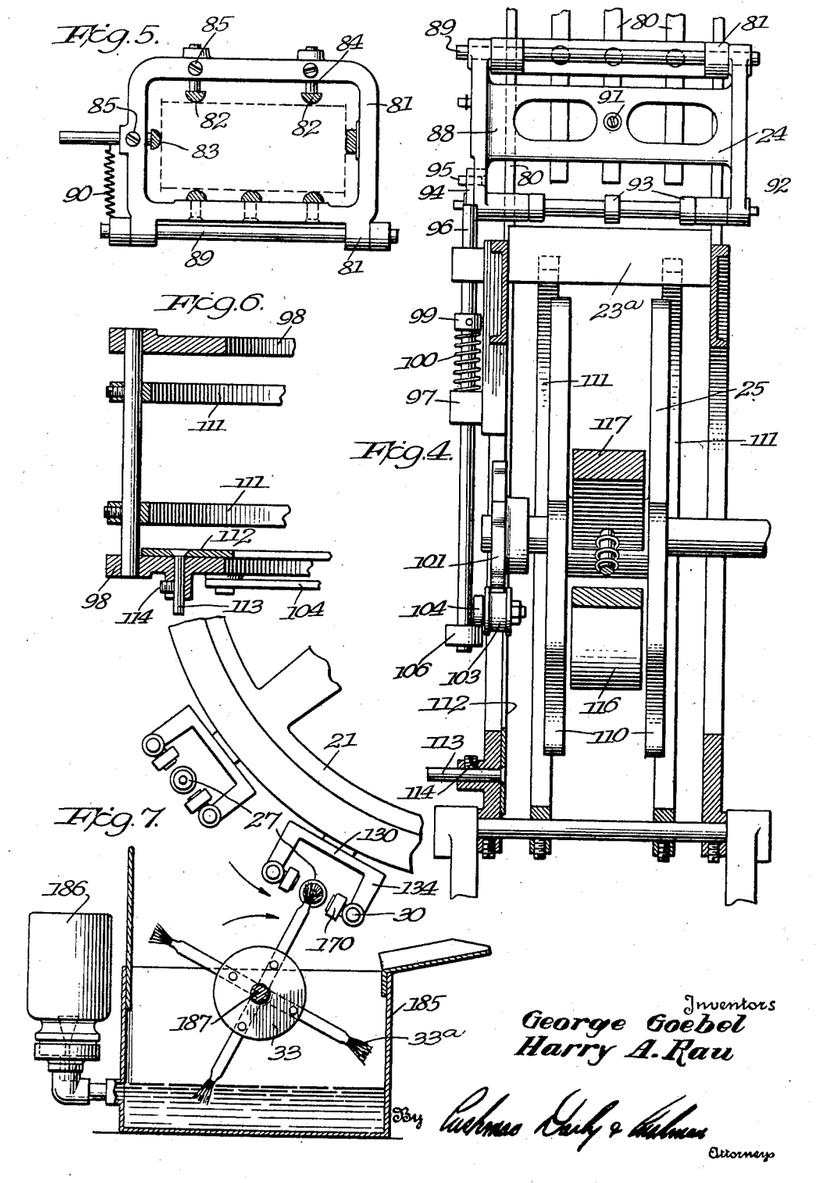
Figure 4 is a vertical sectional view taken on the line 4—4 of Figure 3.
Figure 5 is a horizontal sectional view taken on the line 5—5 of Figure 3.
Figure 6 is a horizontal sectional view taken on the line 6—6 of Figure 3.
Figure 7 is a fragmentary view showing the cleaning mechanism of the apparatus in vertical section.
Figure 6:
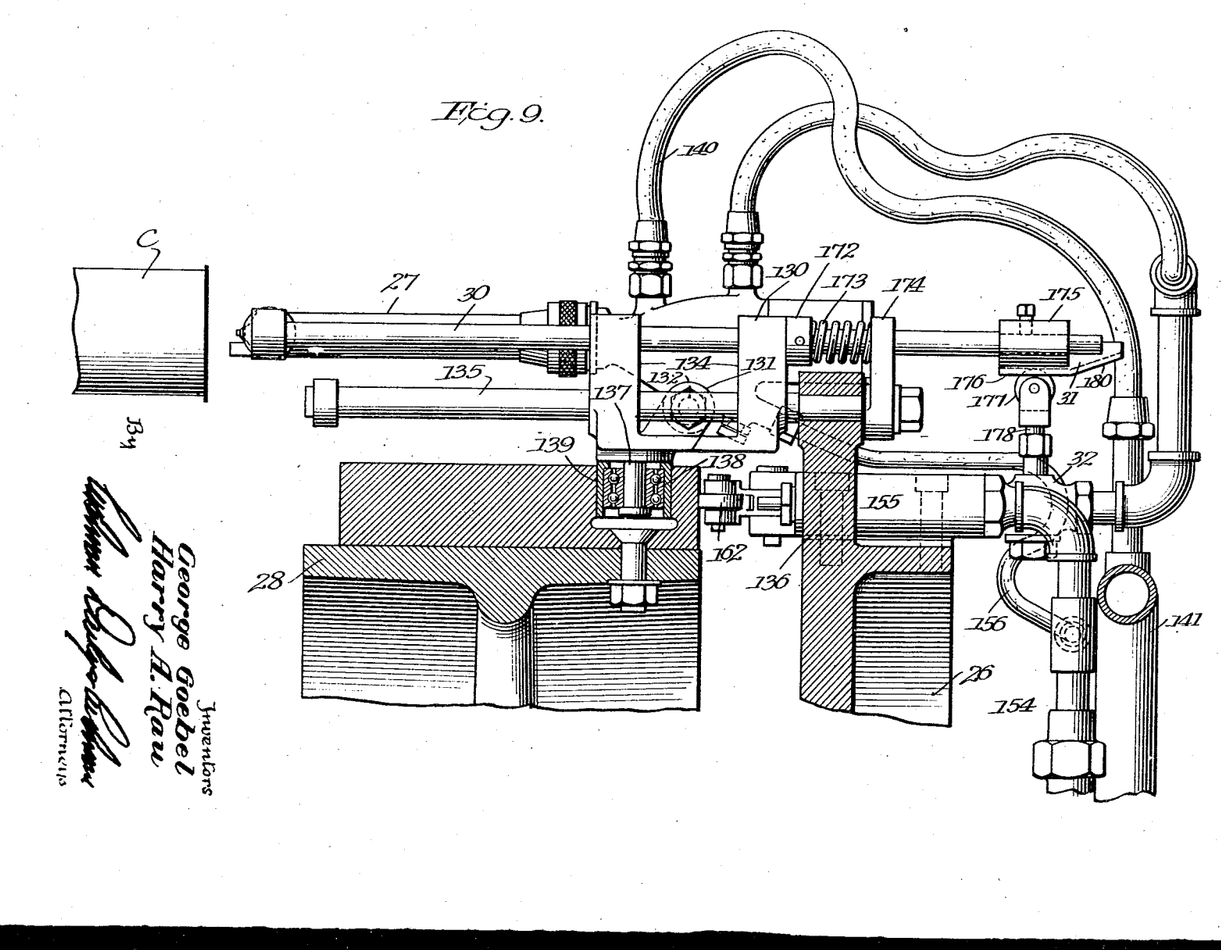

Each spray gun has container contacting members or rods 30 associated therewith which rods will contact with the adjacent and inner edge of a container positioned opposite the spray gun. In the event that a container is not positioned opposite one of the spray guns, the rods 30 associated with that gun will continue their movement toward and over the container supporting element 21 and a valve controlling cam 31 (Figures 9 and 10) operatively associated with the rods 30 will move with the rods and thereby permit an air flow valve 32 to close so that no liquid will be projected from that spray gun. The spraying of the containers will be completed at about the point D indicated in Figure 1, the spray gun being by this time entirely retracted from the container. Continued rotation of the elements 21 and 26 will then bring the nozzle of each successive spray gun 27 in contact with a brush of a rotating cleaning mechanism 33 as illustrated in Figure 7. During a portion of their rotation, the brushes of the cleaning mechanism are immersed in a body of solvent or cleaning fluid and will thereby apply such fluid to the nozzles of the spray guns to clean the same. Further rotation of the elements 21 and 26 will bring the containers C opposite an outfeed chute 34 through which the containers will be moved from the container supporting element 21.

Driving mechanism

Figure 2:
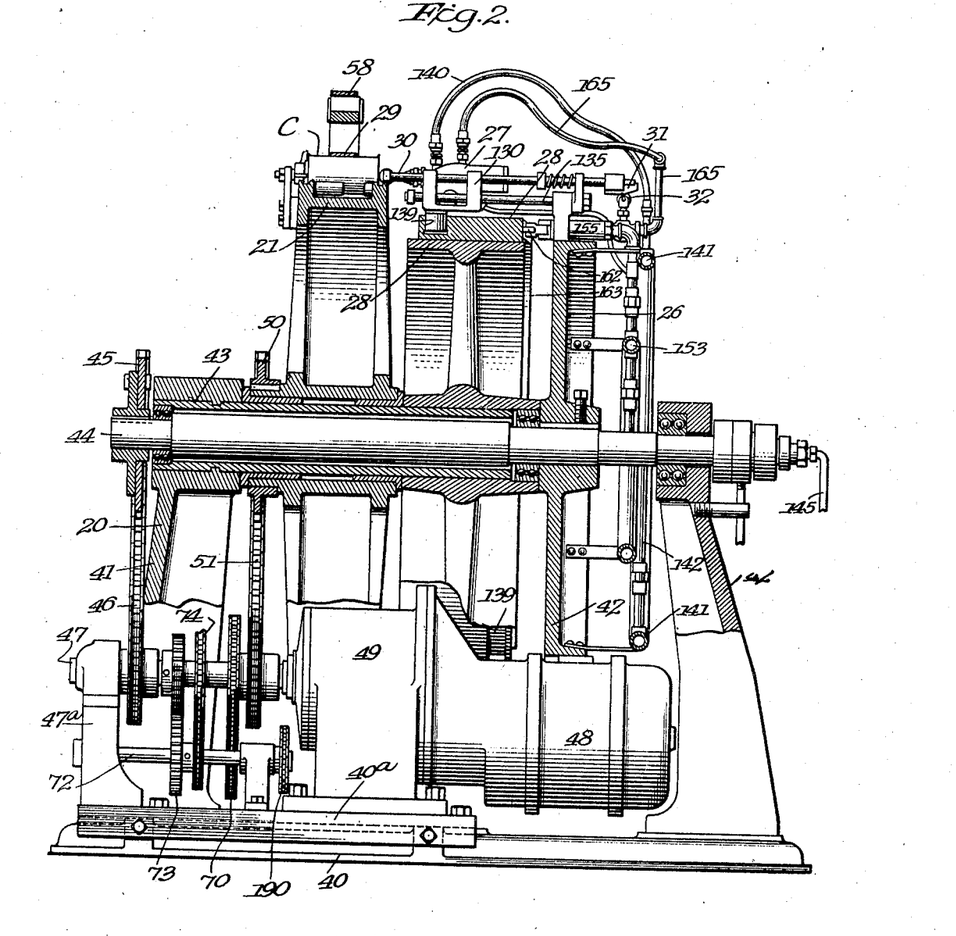
Figure 2 is a longitudinal and vertical sectional view on the line 2—2 of Figure 1.

As best shown in Figures 1 and 2, the base 20 of the machine comprises a base plate 40 having standards 41 and 42 secured thereto. The standard 41 includes a bore in which is fixed one end of a long sleeve 43, and the main shaft 44 of the apparatus is journaled in bearings within this sleeve, with the adjacent end of the shaft projecting outwardly from the standard 41. The opposite end of shaft 44 is journaled in suitable bearings in standard 42. Shaft 44 is provided with a sprocket wheel 45 outwardly of the standard 41, sprocket wheel 45 being engaged by an endless chain 46 driven from a sprocket on a main drive shaft 47 driven from a suitable motor 48 through a gear reducing mechanism 49 and having its outer end journaled in a trunnion 47a.

The wheel or disc 26 upon which the spray guns 27 are mounted is fixed to the main shaft 44 between the inner end of stationary sleeve 43 and the standard 42. Adjacent the standard 41 stationary sleeve 43 has the container supporting element 21 journaled thereon, the hub of the element 21 having a sprocket 50 fixed thereto which is driven through a sprocket chain 51 from the main drive shaft 47. The container supporting element 21 and the spray gun supporting disc 26 are driven at the same speed so that they will move together. Between the container supporting element 21 and the inner end of stationary sleeve 43, the latter has secured thereto a large annular member 28 having the spray gun cam tracks secured to or formed on its periphery. It will thus be observed that the container supporting element 21 and the disc 26 which carries the spray guns are positioned on opposite sides of the stationary and cam carrying member 28.

As best shown in Figure 1, arms 55 project radially from the upper portion of the standard 41 and these arms support an annular frame 58 which substantially encircles and overlies the periphery of the container supporting element 21, being suitably spaced from the periphery of that element. The lowermost portion of the frame 58, the left hand portion in Figure 1, is secured to the base plate 40. A pulley 60 is journaled in the frame 58 almost directly above the main shaft 44 and a second pulley 61 is journaled in the frame adjacent the cleaning mechanism 33. An endless belt 29 passes about these two pulleys, the inner run 63 of the belt being adapted to contact with containers C carried by the container supporting element 21 and the outer run 64 of the belt passing over a take-up pulley 65 which is tended outwardly from the element 21 by a spring 66 so as to hold the inner run 63 of the belt in close engagement with containers on the element 21. The shaft of the lower belt pulley 61 is provided with a sprocket wheel driven by a sprocket chain 68 which also passes about a sprocket wheel on a shaft 69 journaled on the base plate 40 of the machine, shaft 69 being driven from the main drive shaft 47 through a sprocket chain 70. It will be noted that the inner run 63 of belt 29 will move in a direction opposite to the direction of the rotation of the container supporting element 21.

As shown in Figure 2, a countershaft 72 is suitably journaled in brackets below the main drive shaft 47, the countershaft being driven through suitable gearing designated by the numeral 73. Countershaft 72 is provided with a sprocket wheel to drive a sprocket chain 74 (Figure 1) which extends about a sprocket wheel fixed to the shaft 75 on which the infeed dial 25 is mounted. Shaft 75 is journaled at one end in the outer end of an arm 76 extending from the standard 41 as shown in Figure 1.

The infeed mechanism

As is illustrated in Figures 3 to 6, the infeed mechanism includes a substantially vertically disposed chute 23 formed of guide bars generally designated by the numeral 80 and which cooperate to engage the sides and the ends of a container C, the guide bars being supported at spaced points along their lengths by substantially rectangular brackets 81 as shown in Figure 5. Referring to the last-mentioned figure, it will be noted that the guide bars 82 which will engage one side of a container and the guide bar 83 which will engage one end of a container are provided with rearwardly extending pins 84 extending through apertures in the brackets 81 and adapted to be held in adjusted position with respect to the bracket by set screws 85. By this arrangement, the guide bars may be adjusted with respect to the brackets to engage containers of different sizes.

Figure 3:
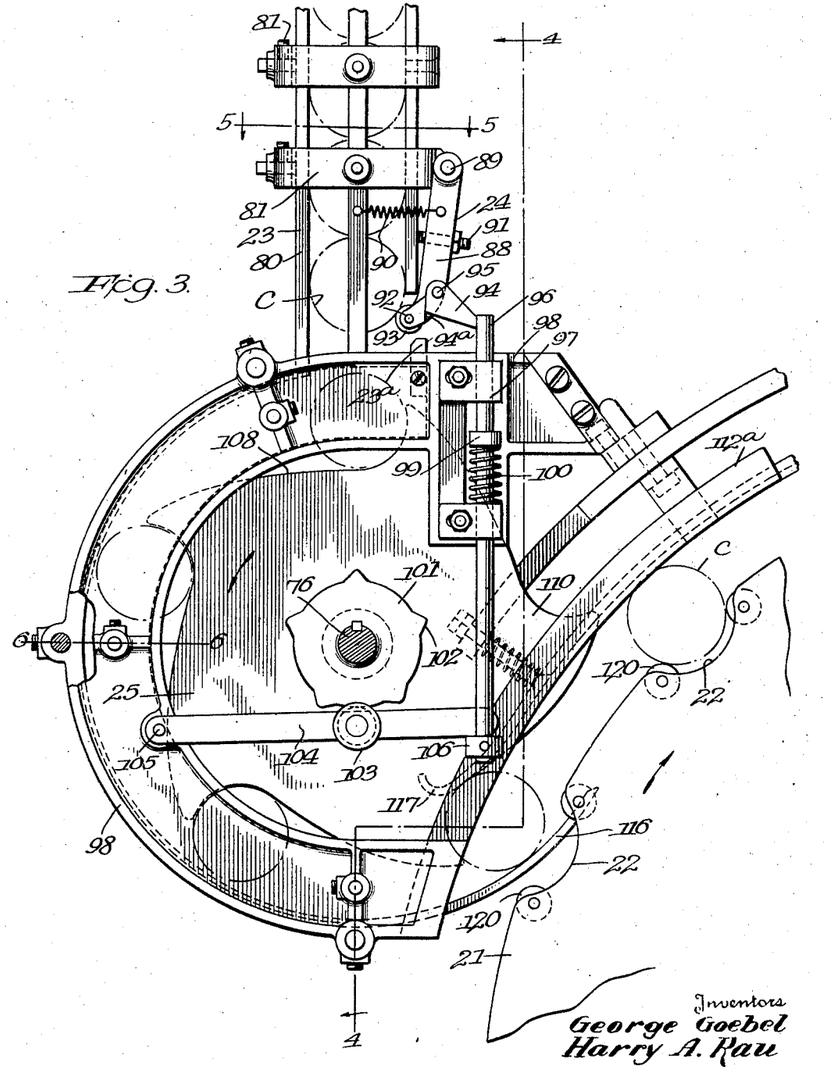
Figure 3 is a side elevation of the infeed mechanism, this view being taken from the opposite direction from the view of the same mechanism included in Figure 1.

As best shown in Figures 3 and 4, the feed control gate 24 is positioned at the lower end of the chute 23 and just above the infeed dial 25. The infeed gate comprises a plate like member 88 arranged to swing on a pin 89 mounted in the lower chute bracket 81, member 88 being tended toward the chute by a spring 90 and its movement in that direction being governed by a set screw 91 arranged to bear on the outer surface of one bar of the chute as shown in Figure 3. At its lower end, the plate member 88 is slightly curved inwardly and a pin 92 extends across this portion and carries container engaging rollers 93, the rollers thereby being adapted to extend somewhat beneath a container C moving down through the chute 23 to hold the container as shown in Figure 3. The gate member 24 is provided on one side and at its lower end with a rearwardly extending dog 94 pivoted to the gate at 95. The end of dog 94 is normally engaged by the upper end of a rod 96 slidably mounted in a guide member 97 adjustably secured to the container retaining frame 98 which surrounds the infeed dial 25.

The slide rod 96 is provided with a collar 99 against which a coil spring 100 bears, the spring serving to tend the rod 96 to the upward position shown in Figure 3. A cam 101 is fixed to the shaft 76 which carries the infeed dial 25, and this cam is provided with spaced rises 102 adapted to contact with a roller 103 carried by a lever 104 pivoted on the frame 98 at 105. The free end of the lever 104 bears upon a collar 106 secured to the lower end of the rod 96, with the result that when lever 104 is depressed by contact of one of the cam rises 102 with roller 103, rod 96 will be drawn downwardly and out of contact with the dog 94, and because spring 90 is not strong enough to hold the gate 88 inwardly when a container is bearing on the same, the dog and the gate member 88 will swing outwardly and hence from beneath the container C shown in the bottom of the chute in Figure 3. The container will thus drop past the foot plate 23a of chute 23 and into the pocket 108 of infeed dial 25 which at that moment will be beneath the lower end of chute 23. Immediately the container has moved by the lower end of gate member 24, spring 90 will draw the gate inwardly and before a second container can force the gate open, cam 101 will permit rod 96 to rise to contact with the rearward surface of dog 94 so that the gate member will be held in the position shown in Figure 3. The dog 94 is pivoted on gate 88 at 95 so that should the rod 96 by any chance strike the under surface of the dog, the latter will be free to swing upwardly to prevent breakage. The inner surface of the dog normally bears against a shoulder 94a on the gate member to thereby hold the latter in the position shown in Figure 3.

The infeed dial 25 is formed of two disc members 110 spaced on the shaft 76, as shown in Figure 4, the two disc members having aligned pockets 108 therein to receive the containers C, and the outer portion of the dial formed by the two discs being enclosed by the arcuate framework 98 including arcuate strap members 111 to retain the containers in the pockets. In order to permit the structure to be adjustable for containers of different lengths, one side of the framework 98, as best shown in Figures 4 and 6, is provided on its inner surface with an arcuate plate 112 having pins 113 extending through the framework, the pins being secured in adjusted position by set screws 114. The position of the arcuate plate 112 with respect to the remainder of the framework may be adjusted according to the length of the containers being handled by the apparatus and so that the opposite ends of the containers will be retained in close contact with the opposite side of the frame 98 while moving about the infeed dial 25. The spacing of the dial discs 110 upon the shaft 76 permits fixed guide members 116 and 117 (Figures 3 and 4) to lie between the discs, these guide members serving to direct containers into the pockets 22 of the container supporting element 21. The dial discs are adjustably mounted on shaft 76 to enable their spacing to be varied.

The container supporting and coating means

Figure 13:
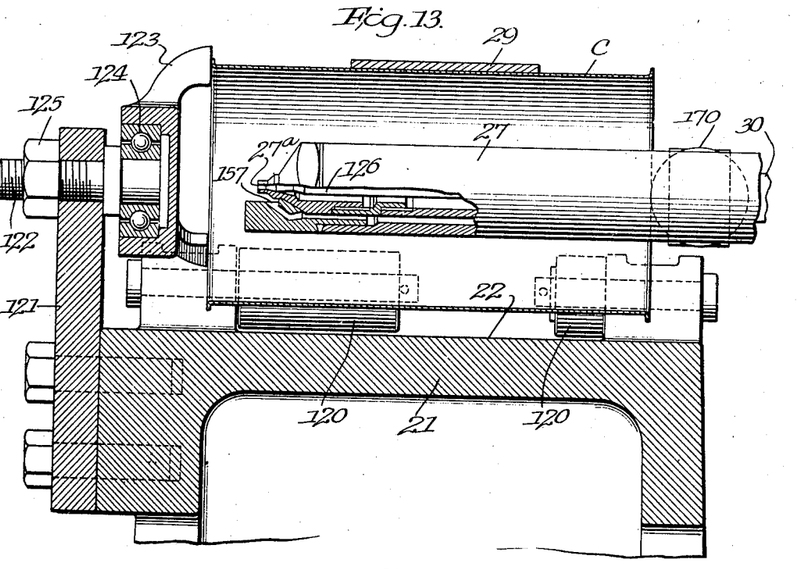
Figure 13 is a vertical sectional view through the periphery of the container supporting element and showing a container in position thereon and with a spray gun or liquid projecting means within the same.

Each pocket 22 (Figure 13) of the container supporting element 21 is provided with container supporting rollers 120, two such rollers being provided at each end of the pocket or depression. The rollers 120 at the end of the pocket distant from the spray gun 27 are shown somewhat longer than those at the opposite end, so that when a number of pockets in succession do not have containers therein the belt 29 will bear on the long rollers 120 and hence cannot have its edges caught on element 21. A plate 121 is secured to the outer surface of the element 21, that is, the surface distant from the spray guns, and in alignment with each pocket or depression 22. The outer end of this bracket has a stud 122 threaded therein which stud carries, at its inner end, a spider 123 against which the outer end of a container C will be positioned by an arcuate guide plate 112a (Figure 3) which is an extension of the end plate 112 within frame 98 surrounding infeed dial 25. The spider 123 is mounted on the stud 122 by anti-friction bearings 124 so that it will be free to rotate with the container, and a lock nut 125 is positioned on the stud to hold it in adjusted position. As will be observed from Figures 1 and 13, the containers C will seat upon the rollers 120 and, during the portion of their travel on the element 21 between the infeed dial 25 and the adjacent end of the belt 29, will be held in the pockets 22 by an inwardly pressed spring plate 126 mounted on the inner side of an extension 127 of the stationary frame 58 which surrounds the container supporting element 21. During the portion of their travel with element 21 beneath the belt 29, the containers will be held in the pockets by the inner run 63 of the belt.

The liquid projecting members or spray guns 27 are of the type wherein the lacquer or other liquid to be used for coating purposes is supplied from a source under pressure, the flow of such liquid through the gun being controlled by a needle valve 126 (Figure 13) operated by compressed air.

Figure 10:
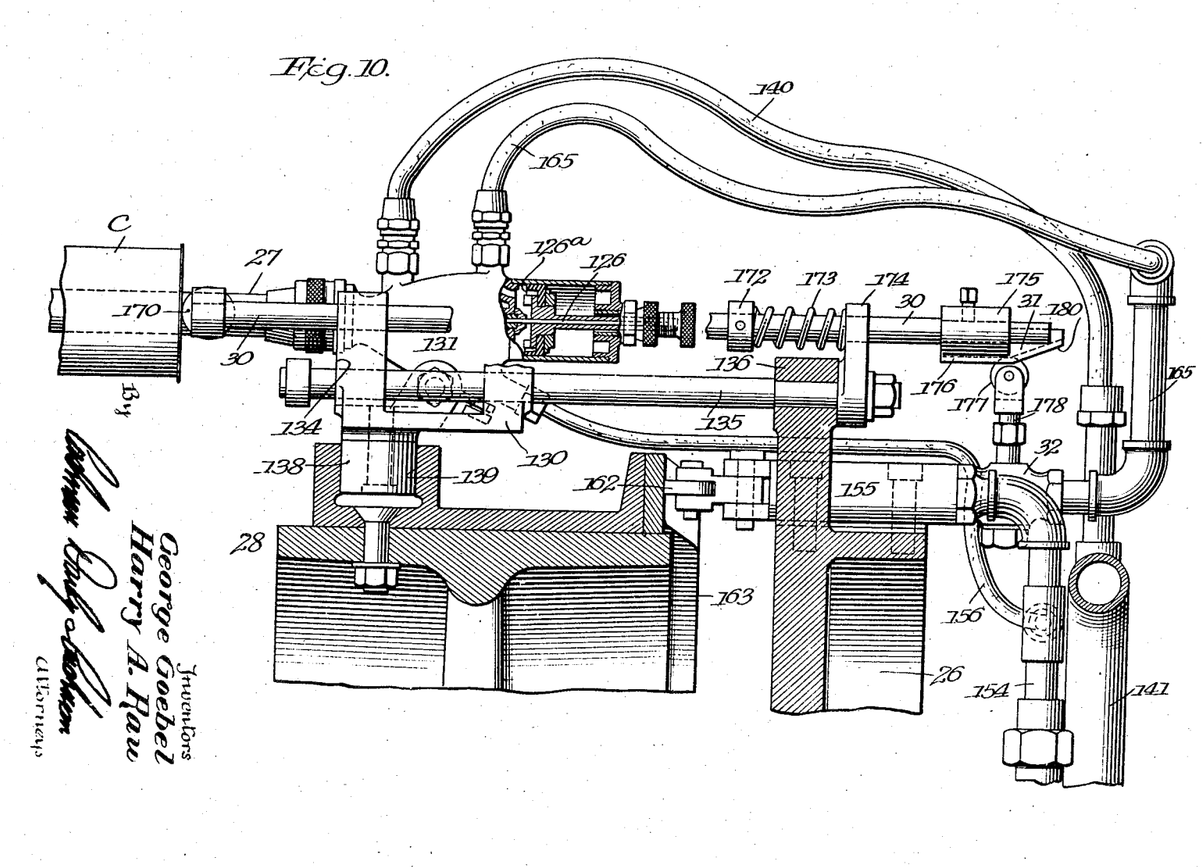
Figure 10 is a view similar to Figure 9, but showing a liquid projecting means or spray gun positioned within a container.
Figure 11:
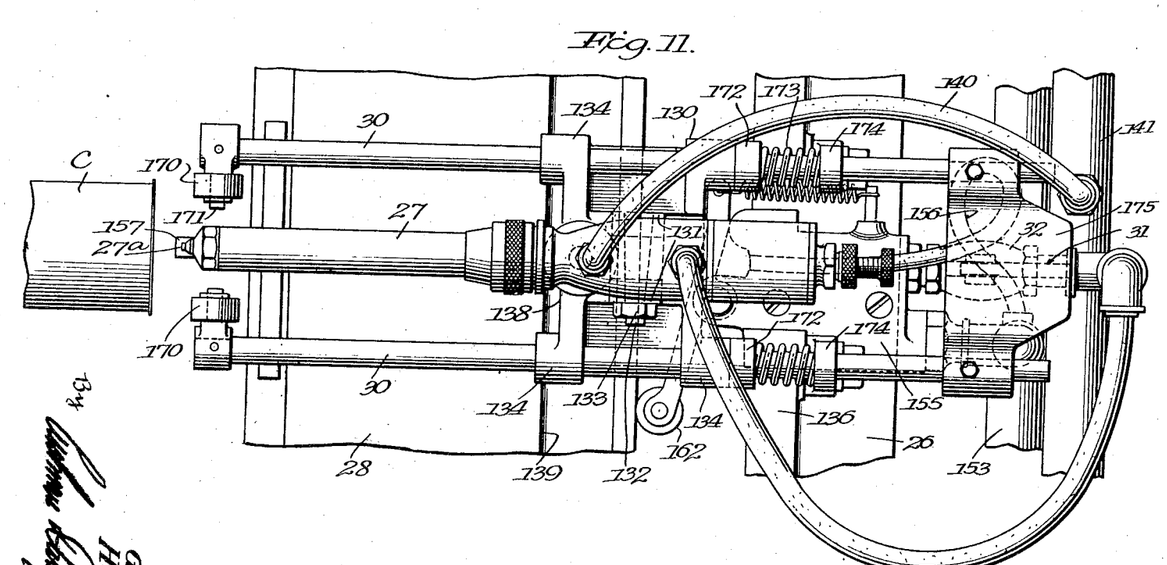
Figure 11 is a top view of a liquid projecting means in the position shown in Figure 9.

As shown in Figures 9 to 11, each gun 27 is fixed in a carriage generally indicated by the number 130, the carriage 130 including a pair of central upstanding and spaced lugs 131 between which a downwardly projecting block on the underside of the gun seats, the block being retained in proper position by any suitable means, such as a pin 132 including a tapered portion and having a nut 135 threaded on its smaller end as best shown in Figure 11.

Each carriage 130 is provided with a pair of upstanding projections 134 at each end thereof and these projections are apertured at their lower portion to fit upon rods 135 secured in shoulders 136 projecting radially from the periphery of the spray gun carrying wheel or disc 26. A pin 137 extends from the lower face of each carriage 130, this pin carrying an anti-frictionally mounted roller 138 fitted in a cam track 139 extending circumferentially of the fixed cam member 28. By the above arrangement, each carriage 130 and the spray gun 27 fixed thereto will be moved with respect to an aligned container C and upon the slide rods 135, the movement of the gun and carriage being controlled by the configuration of the cam track 139.

Figure 15:
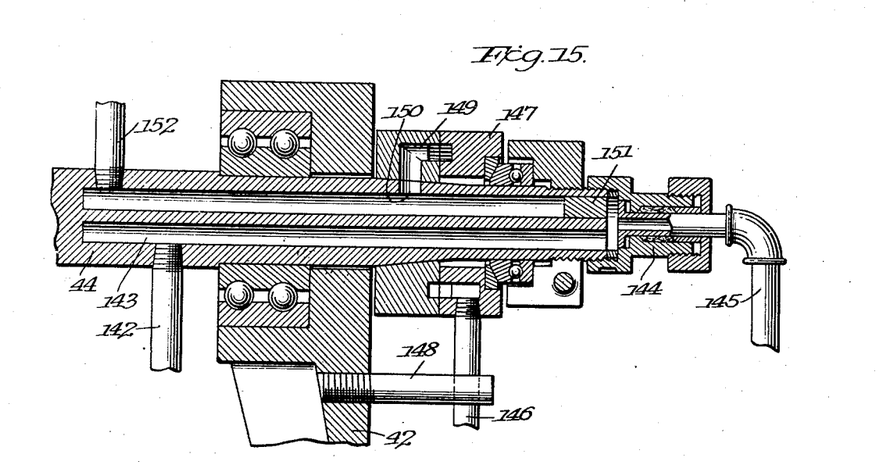
Figure 15 is a sectional view through one end of the main supporting shaft of the apparatus.

Liquid to be projected from the guns is supplied to each gun through a tube 140 connected to the gun as shown in Figures 9, 10 and 11, the other end of tube 140 communicating with a manifold 141 of circular form fixed to wheel 26 (Fig. 8) which manifold is supplied with liquid through a radially extending pipe 142 having its inner end threaded in the main shaft 44 of the apparatus as best shown in Figure 15. The end of shaft 44 adjacent the standard 42 is bored as indicated at 143 and the outer end of the shaft carries a packing element 144 to provide a sealed joint between the bore 143 and a supply pipe 145 which communicates with a source of liquid under pressure, not shown.

Compressed air for operating the needle valves of the guns and also to atomize the liquid projected from the guns is supplied from a reservoir, not shown, through a supply pipe 146 having its inner end threaded in a collar structure 147 which surrounds the end of the shaft 44 adjacent the standard 42, but is held from rotating with the shaft due to the fact that the supply pipe 146 is held against movement by pins 148 projecting from the standard 42. The collar structure 147 is suitably sealed upon the rotating shaft 44 and is provided with passages generally indicated by the numeral 149 which open to a bore 150 in the shaft 44. The outer end of bore 150 is closed by a plug 151 and its inner end communicates, through a radially extending pipe 152, with an air manifold 153 of circular form and secured to wheel 26.

Figure 8:
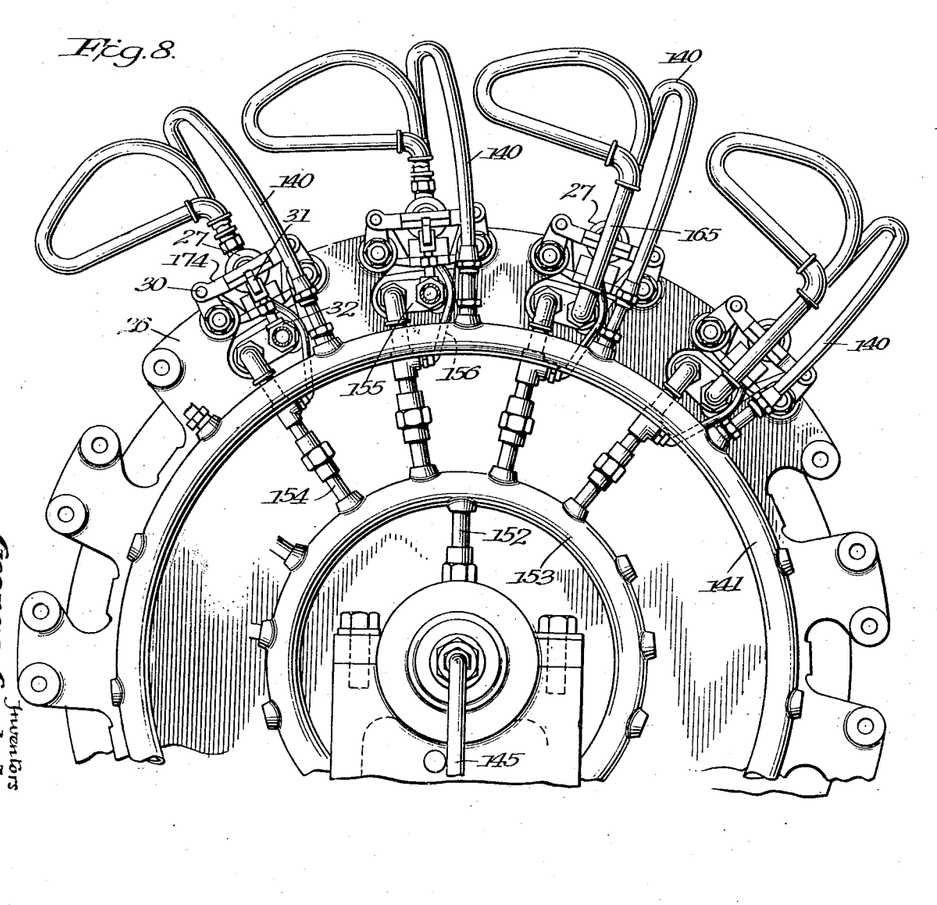
Figure 8 is a side view of the portion of the machine, the view being taken from the right with respect to Figure 2.

A tube 154 projects from manifold 153 toward each spray gun as shown in Figure 8, the outer end of the tube 154 opening to a control valve 155 fixed on the gun supporting disc 26 adjacent each gun. As shown in Figure 10, a tube 156 is connected to each tube 154 at a point in advance of the valve 155 and has its opposite end connected to the associated spray gun 27, tube 156 being provided to supply to the gun a constantly flowing stream of compressed air which issues from the usual atomizing orifice 157 adjacent the nozzle of the gun and to atomize the liquid projected from the gun.

Figure 14:
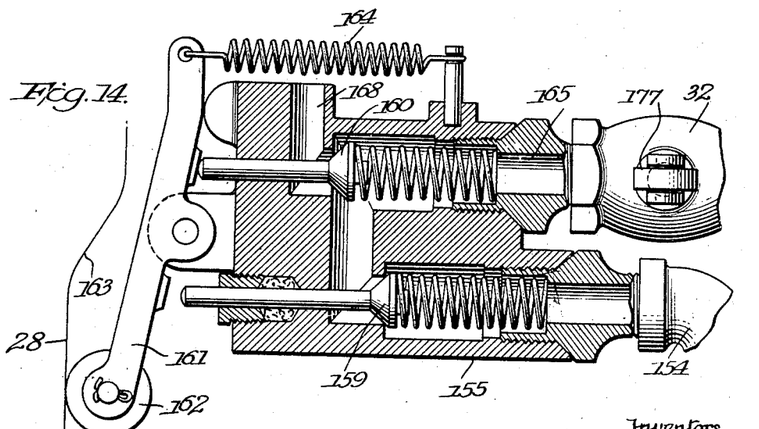
Figure 14 is a detailed sectional view showing the flow control valves associated with each spray gun.

One of the valve mechanisms 155 is illustrated in detail in Figure 14 and, as there shown, each mechanism includes two spring seated valves 159 and 160, respectively, which are controlled by a tappet arm 161 pivoted on the valve mechanism and provided with a roller 162 arranged to contact with a cam track 163 provided on the inner surface of the stationary cam carrying element 28. The roller 162 is held in engagement with the cam track 163 by a coil spring 164. Each valve mechanism 155 has a second control valve 32 connected to its outlet, and a line 165 leads from valve 32 to the associated spray gun, air moving through line 165 to control the needle valve 126 (Figure 10) of the gun in well-known manner by acting upon a piston 126a.

As best shown in Figure 14, the valve 159, when closed, will prevent flow of air to the gun through the pipe 165. Valve 160 controls an outlet port 168 to atmosphere, and will be closed when valve 159 is open, but, when open, will bleed or exhaust any compressed air from the line 165 and gun so that the liquid flow controlling needle valve of the gun may move to closed or non-liquid projecting position.

The operation of the valve 32 is controlled by the following mechanism: As best shown in Figure 11, each spray gun 27 has a pair of container contacting rods 30 associated therewith, one rod on each side of the gun. The ends of the rods 30 adjacent the nozzle of the spray gun are provided with rollers 170 journaled on the inwardly and horizontally extending pins 171 suitably secured to the rods. The rods 30 extend through bores provided in the upper ends of the arms 134 of each gun carriage 130, each rod having a collar 172 fixed thereon rearwardly of the carriage 130 against which one end of a coil spring 173 surrounding the rod bears, the other end of the spring bearing against a plate 174 fixed to the shoulder 136 on the wheel 26, which shoulder, as heretofore described, rigidly carries the gun supporting rods 135. The rearward ends of the container contacting rods 30 are joined by a bracket 175, which, intermediate the rods, carries the cam 31 by which the valve 32 is controlled.

By the above arrangement of container contacting rods 30, when a spray gun 27 is moved toward the container supporting element 21 by the movement of its associated cam roller 138 in the cam track 139, the rods 30 will move with the gun, this movement of the rods being caused by the pressure exerted on collars 172 by the coil springs 173. If a container C is positioned in the pocket 22 of element 21 opposite the spray gun, the rollers 170 on the rods 30 will almost immediately contact with the adjacent end of the container, further movement of the rods will be prevented and the horizontal portion 176 of cam 31 will remain in contact with the roller 177 provided at the upper end of the shank 178 of valve 32, holding the valve open for flow, as shown in Figure 10. On the other hand, if no container C is positioned opposite a spray gun, when the spray gun moves over the container supporting element 21, the container contacting rods 30 will move the full distance with the gun, or at least will be free to move the full distance resulting from the pressure of the springs 173 upon the collars 172, and this travel will be sufficient to move the inclined portion 180 of cam 31 above the roller 177 of valve 32, thereby permitting this valve to move upwardly and close so that no actuating air may flow past valve 32 and through line 165 and against the piston 126a of the gun, even though valve mechanism 155 will be so actuated by cam track 163 that air may flow through the same.

Since the valve mechanism 155 will not be operated by cam 163 to permit flow past valve 32 and through line 165 until the spray gun has moved its full limit of travel over element 21 (to the left in Figure 10), and since, if no container is in alignment with the gun, valve 32 will be closed before the gun has moved this full distance, line 165 will be closed by valve 32 before valve mechanism 155 can open.

Bracket 175 carrying cam 31 is adjustable along the container contacting rods 30 to accommodate the position of cam 31 for cans of various lengths.

Figure 16:
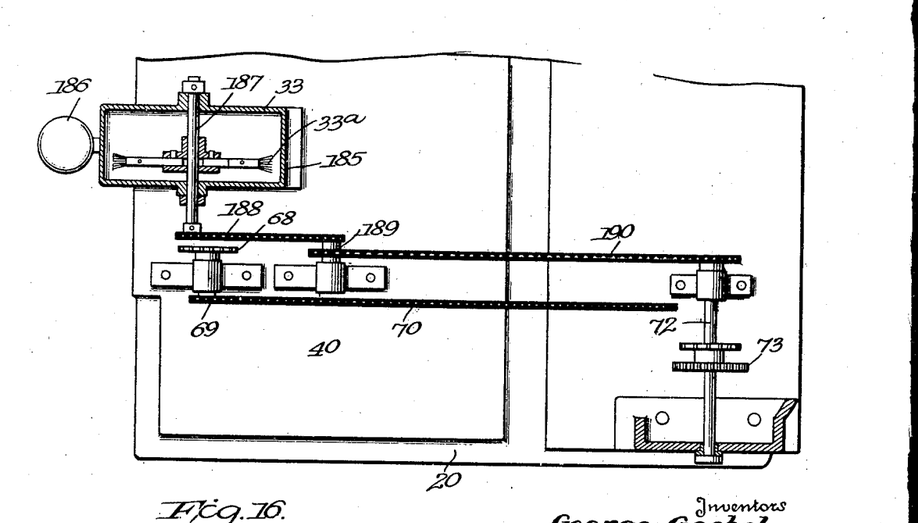
Figure 16 is a horizontal sectional view showing the cleaning mechanism and a portion of the drive of the apparatus.

As best shown in Figures 1, 7 and 16, the cleaning mechanism 33 comprises a tank 185 mounted on the base plate 40 of the apparatus beneath the container supporting element 21. The tank 185 is maintained filled with a suitable solvent or cleaning fluid up to a predetermined level, preferably by means of a barometrically controlled reservoir 186. A shaft 187 is journaled across the upper portion of the reservoir 185, which shaft is rotated through a sprocket chain 188 moved by a suitable sprocket on a stub shaft 189, stub shaft 189 in turn being driven from the countershaft 72 through a sprocket chain 190. Shaft 187 is equipped with radially extending brushes 33a as shown in Figure 7, and the speed of rotation of shaft 187 is so timed with respect to the speed of rotation of the main shaft 44 of the apparatus that one of the brushes 33a of the cleaning mechanism will wipe the nozzle of each spray gun as it moves over the cleaning mechanism 33. The cleaning mechanism may be provided with suitable splash guards as shown in Figure 7.

The spray guns will be entirely retracted from the containers C by the time that the container has moved around and out of contact with the belt 29 and the spray gun will therefore be clear of the container and its nozzle will be in alignment with a brush 33a.

An arcuate band 191 is positioned opposite the portion of the container supporting element between the end of the belt 29 and the outfeed chute 34, band 191 being held inward and against the containers by suitable springs such as 191a which are positioned between the band 191 and the frame 58. A guide finger 192 projects from the upper portion of the mouth of the outfeed chute 34 and between the rollers 120 to remove containers from the pockets 22 and direct them to the outfeed chute 3.

*Operation*

The operation of the above apparatus is as follows: A container C moving down the infeed chute 23 (Figure 3) will be retained in the position illustrated at the bottom of the chute by the gate member 24 until the infeed dial 25 has rotated to such position that one of the pockets 108 of the dial will be in position to receive the container, the stop member 24 being permitted to move back to drop the container because of the lowering of latch rod 96 resulting from the rotation of the cam 101.

The chute 23 may be adjusted for the length and diameter of the cans to be operated upon by varying the position of the strips 82 and 83 with respect to the supporting brackets 81 of the chute, and the end plates 112 of the framework surrounding the infeed dial 25 may be similarly adjusted.

Successive containers will move from the infeed dial 25 and into the pockets 22 of the container supporting element 21, each container or container blank being so delivered to a pocket of the container supporting element 21 that its outer end will be in contact with the spider 123 of that pocket.

Figure 12:
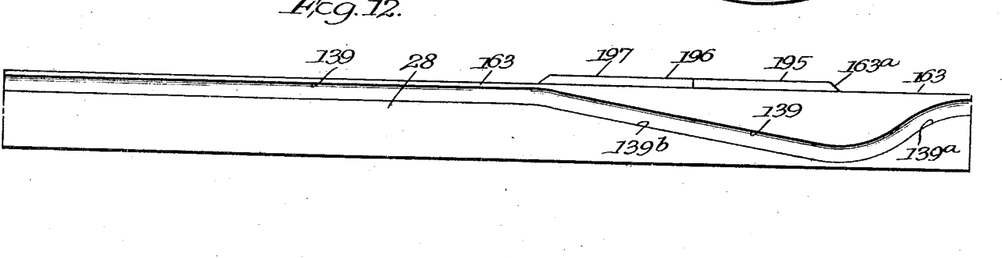
Figure 12 is a diagrammatic view of the cams which control the position of and flow from the liquid projecting means.

When a container has been placed in one of the container receiving pockets 22 of the container supporting element 21, the spray gun 27 arranged opposite the container and on the wheel 26, will move into the container, due to the movement of the roller 138 of that gun in the cam track 139 on stationary cam member 28. Figure 12 diagrammatically shows the layout of the cam surfaces on stationary member 28, and, referring to this view, the point A thereon corresponds to the point in the rotation of the container supporting element 21 and gun carrying wheel 26 at which containers are positioned on the element 21 by the infeed dial. Point B of Figure 12 approximately corresponds to the line B in Figure 1, adjacent the near end of belt 29. From the configuration of the portion 139a of the cam groove 139 between points A and B of Figure 12, it will be observed that the roller 138 of a spray gun, and also the gun itself, will be moved toward the container supporting element 21 during these two points. That is to say, by the time that a container C has moved sufficiently far with the container supporting element 21 to come in contact with the inner run 63 of belt 29, the spray gun 27 in alignment with that container supporting pocket 22 will have moved the full possible limit of its movement into the container and its nozzle will be in position to project liquid upon the inner surface of the far end of the container.

If a container has been placed in position in the pocket 22 with which the spray gun is aligned, the rollers 170 on the adjacent ends of the container contacting rods 30 will contact with the right hand end of the container as shown in Figure 10, and the cam 31 mounted at the opposite ends of these rods will have its horizontal surface 176 in contact with the roller 177 of the valve 32 so that this valve will be open. If no container is in the pocket 22, the movement of the container contacting rods 30 will not be limited and they will move a further distance to the left, with the result that the inclined surface 180 of cam 31 will be in contact with the roller 177 of valve 32, so that the valve may move upwardly and to closed position, thereby obviating all possibility of the spray gun receiving any compressed air to open its needle valve.

Assuming that a container is positioned in the pocket 22 opposite the spray gun under discussion, at the moment that the spray gun reaches its innermost position with respect to the container, the roller 162 of tappet lever 161 will come in contact with the rise 163a of cam track 163, tilting the lever 161 from the position shown in Figure 14 to cause the valve 159 of valve 155 to be opened and the valve 160 closed. This position of the valves will permit compressed air to flow from tube 154 and through valves 159 and 32 into pipe 165 and thence into the spray gun. This flow will actuate the needle valve 126 (Figure 13) of the spray gun to opened position so that the liquid moving to the spray gun through tube 140 will be projected through nozzle 27a. The continuous flow of air from the air nozzle 157 of the gun 27 will cause the liquid projected from nozzle 27a to be atomized and projected upon the inner surface of the container. Simultaneously with or just prior to the commencement of the spraying of liquid, the container will come in contact with the inner run 63 of belt 29, with the result that the container will be rotated upon the rollers 120 of the pocket 22 in which it is supported, and so that the coating liquid will be evenly and thoroughly applied. As will be observed from Figure 1, the inner run 63 of the belt 29 moves in a direction opposite to the direction of rotation of the container supporting element 21 so that the container will be bodily rotated, that is, rotated about its own longitudinal axis, as it moves with the element 21.

As is indicated in Figure 12, the portion 139b of cam track 139 past point B is inclined away from the container supporting element 21. Because of this, the gun will move gradually outwardly from the container as the container is moving beneath the belt 29. It will also be observed from Figure 12 that the rise 163a of cam 163 which controls tappet lever 161 and, therethrough, the valve mechanism 155, coincides with the incline 139b of cam track 139. The valve mechanism 155 will thus be held open to permit liquid to be sprayed within the container during the retractive movement of the gun. Figure 12 shows the rise 163a formed in two sections 195 and 197. Sections 195 and 197 may be held on the cam carrier 28 by set screws so that they will be removable. By this construction, if shorter containers are to be operated upon, obviating the necessity of continuing the spraying of liquid during such a large part of the retractive movement of the gun from the container, section 197 may be replaced by a shorter section so that the spraying will be discontinued somewhat sooner.

The point D of Figure 12 coincides with the point D on Figure 1 and it will therefore be observed that by the time that a container has reached point D of Figure 1, the spray gun will have been entirely retracted from the container and will be positioned as in Figure 9, spraying having been discontinued just immediately prior to this point even with a longer container, as indicated by the termination of rise 163a of cam 163 in Figure 12. Immediately thereafter, the nozzle of the spray gun 27 will contact with one of the brushes 33a of cleaning mechanism 33 and any liquid adhering to the nozzle will be removed therefrom so that the nozzle will be kept unobstructed. It will be understood that when the apparatus is being used to spray quick drying varnish or lacquer such as is used in spraying metal containers, such liquid may dry upon the nozzle and cause it to become clogged. The cleaning mechanism 33 will prevent this.

After the container has moved out of contact with the belt 63, it will move along in its pocket 22 and upon the spring-pressed band 191 until it comes in contact with the finger 192 which will remove it from the pocket 22 and direct it to the outfeed chute 34.

As best shown in Figures 1 and 2, the motor 48, gear-reducing mechanism 49 and trunnion 47a are carried on a plate 40a which is slidable on base-plate 40 of the apparatus and by operation of adjusting bolts 40b may be moved relative to the base-plate to adjust the tension of the various sprocket-chains and belts.

It will be apparent from the foregoing description that the apparatus of the present invention is applicable to coating operations of various types upon complete containers, including cans, as well as other articles, of numerous conformations and sizes, and regardless of the material of which the articles are formed, also, that the showing in the drawings of a can body member is merely illustrative of the general operation of the apparatus.

It will be understood that the invention is not limited to the details of construction disclosed herein, and that the example of the use of the apparatus which has been given does not include all of the uses of which it is capable; and that the phraseology employed in the specification is for the purpose of description and not of limitation.

We claim:

1. A container coating apparatus comprising a rotary member to support an article, means to rotate the article during its movement with said member, means moving with said member to project liquid upon the article, and means moving with said rotary means to control said last-named means responsive to the presence of an article on said member.

2. A coating apparatus comprising a rotary member, liquid projecting means moving with said rotary member, means to support an article on said member in alignment with said liquid projecting means, means to bodily rotate the article, and a stationary cam track adapted to move said liquid projecting means with respect to the article.

3. The combination in a coating apparatus, of liquid projecting means mounted for movement in a predetermined path, means to operate said means to cause liquid to be projected therefrom, and means in the path of movement of said liquid projecting means to clean said projecting means when flow therefrom has terminated.

4. A container coating apparatus comprising a rotary member adapted to support containers at spaced points on its periphery, means to bodily rotate the containers on said rotary member, liquid projecting means mounted in axial alignment with each container and movable with said rotary member, cam means to move said liquid projecting means longitudinally with respect to the containers, means to supply liquid to said liquid projecting means, and means to control the flow of liquid to said projecting means responsive to the presence of containers on said rotary member.

5. A container coating apparatus comprising a rotary member adapted to support containers at spaced points on its periphery, means to bodily rotate the containers on said rotary member, liquid projecting means mounted in axial alignment with each container and movable with said rotary member, cam means to move said liquid projecting means longitudinally with respect to the containers, means to supply liquid to said liquid projecting means, container contacting members associated with each of said liquid projecting means, and a cam operatively associated with said last named means to control projection of liquid from said liquid projecting means.

6. A container coating apparatus comprising means to move a container through a predetermined path while supporting the same with its axis in a horizontal plane, means to rotate the article about its own axis while moving through said path, means carried by said first named means to project liquid upon the article, and means to move said last named means axially with respect to the article.

7. A container coating apparatus comprising a rotary drum having a plurality of container seats spaced about its periphery, each container seat including a stop at one end thereof, a liquid projecting means and a contact member aligned with each seat, means to position cams upon the seats, means to subsequently urge said contact member toward the stop on the corresponding container seat, a valve member operatively associated with each liquid projecting means adapted to supply liquid to said projecting means if movement of the corresponding contact member is prevented by a container on the aligned seat, and positive means to subsequently move said contact member away from said stop.

8. A container coating apparatus including a supporting element having a plurality of container seats thereon, a reciprocable liquid projector and contact member aligned with each seat, means to move said projector toward a seat and axially of a container seated thereon, means controlled by movement of a projector to urge the corresponding contact member to simultaneously move toward the seat, a projecting fluid supply line communicating with each projector, a valve in said supply line urged to closed position, and cam means operated by said contact member to hold said valve in open position if said contact member engages a container on the corresponding seat.

9. A container coating apparatus including a moving supporting element having a plurality of container seats thereon, a reciprocable liquid projector and contact member aligned with each seat, means to move said projector toward a seat and axially of a container seated thereon, means controlled by movement of a projector to urge the corresponding contact member to simultaneously move toward the seat, a projecting fluid supply line communicating with each projector, a valve in said supply line urged to closed position, and cam means operated by said contact member to hold said valve in open position if said contact member engages a container on the corresponding seat.

10. A container coating apparatus comprising a rotary container supporting member including a plurality of container seats, means to feed containers to said seats, means to remove containers from said seats, means to rotate said container supporting member to conduct the container seats successively past said feeding and removing means, a liquid projecting device and a control member operatively connected thereto and movable with said supporting member and also movable into each container seat, and means between said container feeding means and removing means to move each projecting device and its control member toward and then from the corresponding seat so that the projectors and controls will be clear of the seat at said feeding and removing means.

11. A container coating apparatus comprising moving supporting means for a container, means to bodily rotate the container while supported on said supporting means, means carried by and moving with said supporting means to project liquid upon the container, and means moving with said supporting means to control said last-named means responsive to the presence of a container on said supporting means.

12. A container coating apparatus including a moving supporting element having a plurality of container seats thereon, a reciprocable liquid projector and contact member aligned with each seat, means to move said projector toward a seat and axially of a container seated thereon, means controlled by movement of a projector to urge the corresponding contact member to simultaneously move toward the seat, a projecting fluid supply line communicating with each projector, a valve in said supply line, means operated by movement of said supporting element to open said valve, a second valve in said supply line urged to closed position, and cam means operated by said contact member to hold said second valve in open position if said contact member engages a container on the corresponding seat.

13. A container coating apparatus comprising a rotary member adapted to support a plurality of containers for movement therewith, means for rotating the containers about their axes during their movement with said member, spray guns mounted for rotary movement coaxially with said member and aligned with the containers supported thereon, and means for rendering the guns inoperative when containers are not present on said member in position to receive coating material from the guns, said means including a valve associated with each gun and mounted for rotation therewith.

14. A container coating apparatus comprising a rotary member adapted to support a plurality of containers for movement therewith, means for rotating the containers about their axes during their movement with said member, spray guns mounted for rotary movement coaxially with said member and aligned with the containers supported thereon, means for rendering the guns inoperative when containers are not present on said member in position to receive coating material from the guns, said means including a valve associated with each gun and mounted for rotation therewith, movable cam means for controlling the valves, and a container contacting member adapted to control the position of said cam means, responsive to the presence or absence of containers.

GEORGE GOEBEL.
HARRY A. RAU.